US009623548B1

(12) United States Patent
Johnson

(10) Patent No.: US 9,623,548 B1
(45) Date of Patent: Apr. 18, 2017

(54) ROOF SHINGLE REMOVING DEVICE AND METHOD

(71) Applicant: David M. Johnson, Wonder Lake, IL (US)

(72) Inventor: David M. Johnson, Wonder Lake, IL (US)

(*) Notice: Subject to any disclaimer, the term of this patent is extended or adjusted under 35 U.S.C. 154(b) by 0 days.

(21) Appl. No.: 15/044,268

(22) Filed: Feb. 16, 2016

Related U.S. Application Data

(60) Provisional application No. 62/254,319, filed on Nov. 12, 2015.

(51) Int. Cl.
   *E04D 15/00* (2006.01)
   *B25G 1/01* (2006.01)
   *A01D 9/02* (2006.01)

(52) U.S. Cl.
   CPC ............... *B25G 1/01* (2013.01); *A01D 9/02* (2013.01); *E04D 15/003* (2013.01)

(58) Field of Classification Search
   CPC .... B25G 1/01; A01D 9/02; A01D 9/06; E04D 15/003; A47L 13/08
   USPC ................ 294/49, 55.5, 57, 59, 50.5; 81/45
   See application file for complete search history.

(56) References Cited

U.S. PATENT DOCUMENTS

| 4,009,743 | A | * | 3/1977 | Ackerman | ............ E04D 15/003 30/169 |
|---|---|---|---|---|---|
| 4,691,954 | A | * | 9/1987 | Shaud | ...................... B25G 1/04 16/422 |
| 5,957,516 | A | * | 9/1999 | Jacobs | ..................... A01B 1/02 294/57 |
| 6,105,470 | A | * | 8/2000 | Hutchins | ............... E04D 15/003 30/170 |
| 6,792,829 | B2 | * | 9/2004 | Garcia | .................. E04D 15/003 254/131.5 |
| 7,520,197 | B2 | * | 4/2009 | Kingham | .............. E04D 15/003 299/37.1 |
| 7,581,771 | B2 | * | 9/2009 | Rosine | ..................... A01B 1/02 294/54.5 |
| D727,696 | S | * | 4/2015 | Clark | .............................. D8/10 |
| 2005/0120831 | A1 | * | 6/2005 | Parker | .................. E04D 15/003 81/45 |

FOREIGN PATENT DOCUMENTS

CA            2 453 051        *    3/2005

* cited by examiner

*Primary Examiner* — Dean Kramer
(74) *Attorney, Agent, or Firm* — Mathew R. P. Perrone, Jr.; Joseph Whang

(57) ABSTRACT

The invention relates to a shock absorbing shingle removing tool, and more particularly, to a shock absorbing shingle removing tool, which can safeguard users from fatigue and injury accumulated from repeated contact between the blade of traditional roof removing device and fasteners which often occurs in the act of removing roof shingle.

13 Claims, 12 Drawing Sheets

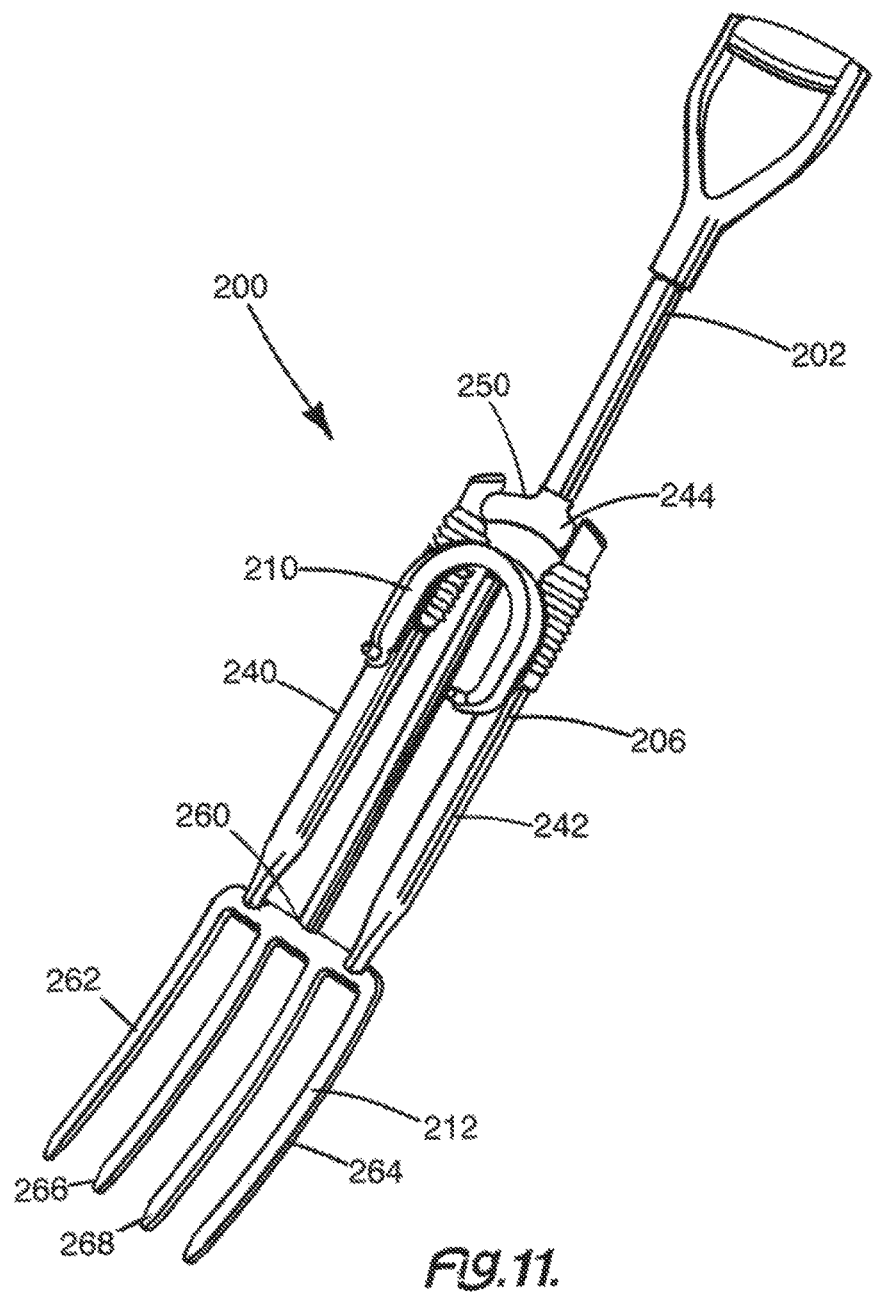

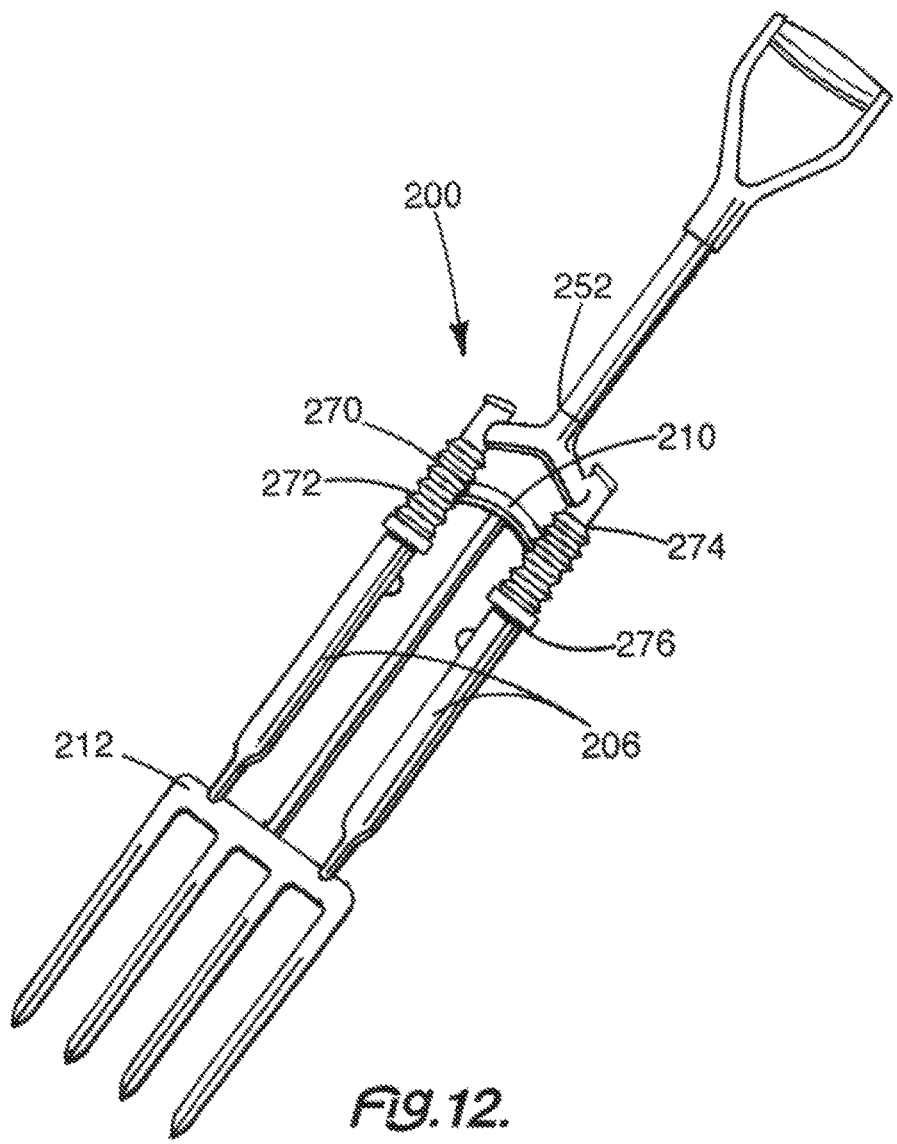

ROOF SHINGLE REMOVING DEVICE AND METHOD

The present invention relates to a device and method for removing roof shingles from a roof deck prior to replacement or repair. More specifically, a shock absorbing roof shingle removing device and method are provided for removing old roof shingles efficiently and with decreased effort and potential injury to workers.

CROSS REFERENCE TO RELATED APPLICATIONS

This application is a continuation in part of U.S. Provisional Patent Application Ser. No. 62/254,319, filed Nov. 12, 2015, filed by the same inventive entity.

BACKGROUND OF THE INVENTION

Removal or "tear offs" of existing roof shingle from a structure, including removal of shingles and shingle fasteners, is a physically demanding process. Many roofers suffer fatigue and find themselves in pain when forcibly bashing in the wood to remove building materials, such as shingles, and especially when encountering the nails or other fasteners. The result is that a worker involved in such manual removal often suffers from pain or injuries. In particular, the injuries can have an effect on the back, the arms, or the elbows, as a result of the physical exertion required during removal process.

Shingle removing devices typically include either manually operated or automated devices. Manually operated devices tend to require significant effort on the part of the worker to effectively move below shingles, nails or other parts from the roof deck. For larger jobs, such as commercial buildings and multifamily units, manually operated shingle removing devices on such larger roof expanses can result in significant physical effort. On larger jobs, workers may take several hours or even days to effectively remove all the old roof shingles.

For certain labor-intensive roof construction operations, automated or motor driven devices have been deployed to remove shingles. Although potentially more effective and efficient than using a manually operated device, automated or motor driven devices tend to include complex moving parts, which can be expensive to replace and maintain. Additionally motorized devices are heavier by nature due to the additional components.

A need, therefore, exists for improved devices and methods for removing the building material. Specifically, a need exists for improved devices and methods for removal of building material quickly and easily.

A need further exists for improved devices and methods for removing roof shingles, while decreasing strain and potential injury to the workers.

Moreover, a need exists for improved devices and methods for removing the material that are both user-friendly and generally lightweight.

A need further exists for shock absorbing tool for tearing off material, which is easy to maintain.

SUMMARY OF THE INVENTION

The present invention relates to devices and methods for removing roof shingles, which can include shingles and fasteners, prior to replacement or repair with new roof shingles. Specifically, the present invention relates to a shock absorbing device useful for stripping roofing shingles and fasteners from a roof deck, while avoiding excess fatigue and pain to the user.

To this end, in an embodiment of the present invention, a device for removing shingles and, fasteners from a root deck is provided. The device comprises a body having a handle and a stripping element disposed at an end opposite to the handle, and a shock absorbing mechanism house within the body.

In another embodiment, a shock absorbing device for use in removing roof shingles, including shingles and fasteners from a roof, is provided. The device includes a body having a handle at one end, a stripping element comprising a plurality of tines on and opposite from the handle, and the shock absorbing system, including at least one spring-loaded mechanism house within the body.

In yet another embodiment, the stripping element includes a blade.

In a further embodiment, the body comprises a fork having arms connected to the top by a horizontal top section.

In yet another embodiment, the socket absorbing system includes a pair of shock absorbing spring-loaded mechanisms positioned within each arm of the body of the device.

In a further embodiment, the shock absorbing spring-loaded mechanism includes a flexible outer sleeve, housing an inner sleeve that is connected at its lower end to a piston, which in turn is connected to a spring.

In yet another embodiment, the spring absorbs the kinetic energy generated when the devices in use, and dissipates the energy away from the user.

In a still another embodiment, the shock absorbing spring-loaded mechanism uses a single spring structure, which permits a slight rotation to make shingle removal more efficient.

It is, therefore, an advantage and objective of the present invention to provide a roof shingle removing device that provides the shock absorbing system to decrease fatigue and pain for the user.

It is yet another advantage and objective of the present invention to provide a roof shingle removing device that is relatively lightweight and easy to use.

These and other objectives of the invention (which other objectives become clear by consideration of the specification, claims and drawings as a whole) are met by providing a roof shingle removing device having a handle assembly connected to a fork assembly through a shock absorbing assembly.

BRIEF DESCRIPTION OF THE DRAWINGS

FIG. 11 depicts a perspective view of dual spring removing device 200 of this invention.

FIG. 12 depicts a plan view of dual spring removing device 200 of this invention, based on a reverse view of FIG. 11.

Throughout the figures of the drawings, where the same part appears in more than one figure of the drawings, the same number is applied thereto.

DESCRIPTION OF THE PREFERRED EMBODIMENTS

Figure 7:
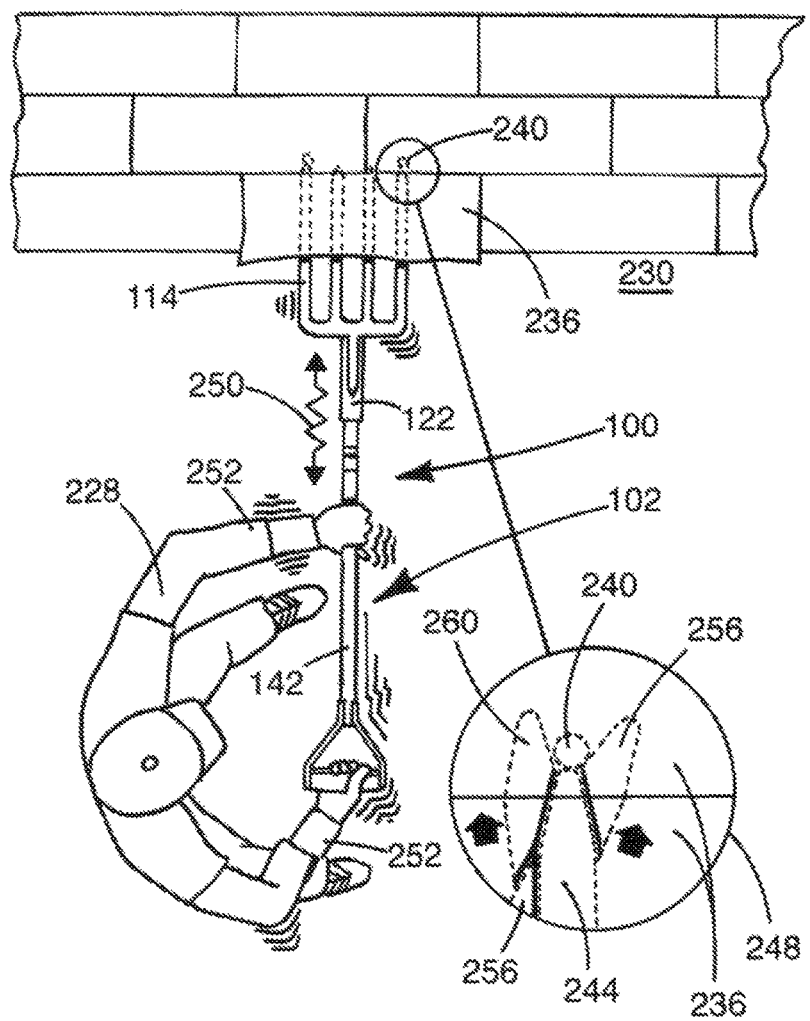
FIG. 7 depicts an overview of a roof shingle removing device 100 of the present invention, in use.

Reference will now be made in detail to several embodiments of the invention that are illustrated in accompanying drawings. Whenever possible, the same or similar reference numerals are used in the drawings and the description to refer to the same or like parts or steps. The drawings are in simplified form and are not to precise scale. For purposes of convenience and clarity only, directional terms such as proximal, distal, ventral, and dorsal, may be used with respect to the drawings. The terms "proximal" and "distal" refers to the anatomical definition indicating the regions nearer and further, respectively, to the center of the body or the point of attachment, specifically referring to the length of the handle assembly. The terms "ventral" and "dorsal" refers to the anatomical definition indicating the underside and upper side of the invention, specifically the width of the handle assembly, and where FIG. 7 shows the ventral side of the invention. These and similar directional terms are not to be construed to limit the scope of the invention in any manner. The words attach, connect, couple, and similar terms with their inflectional morphemes do not necessarily denote direct or intermediate connections, but may also include connections through mediate elements or devices In accordance with the present invention, the present disclosure relates to a device and method for removing old roof shingles including shingles and shingles and fasteners, such as nails, from a stack surface. Specifically the present disclosure includes a shock absorbing device and method for removing old roof shingles, while preventing fatigue and physical pain to the user.

Figure 1:
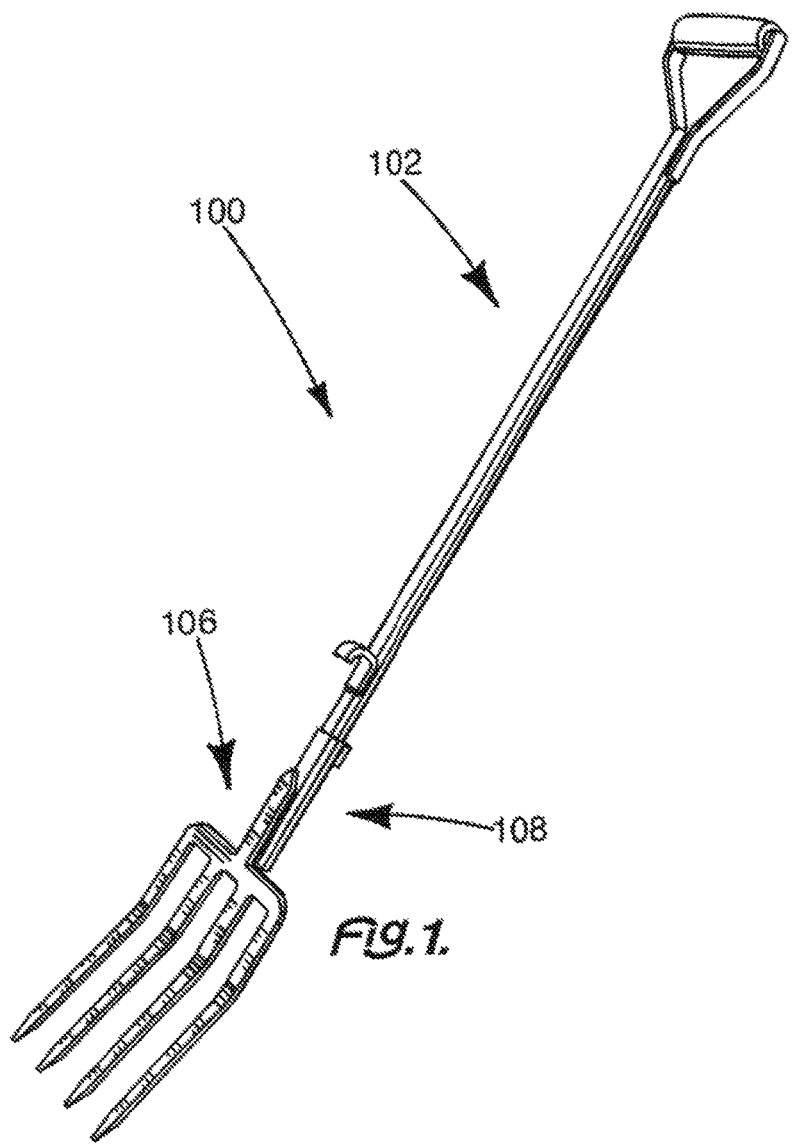
FIG. 1 depicts a front perspective view of a roof shingle removing device 100 of the present invention.
Figure 2:
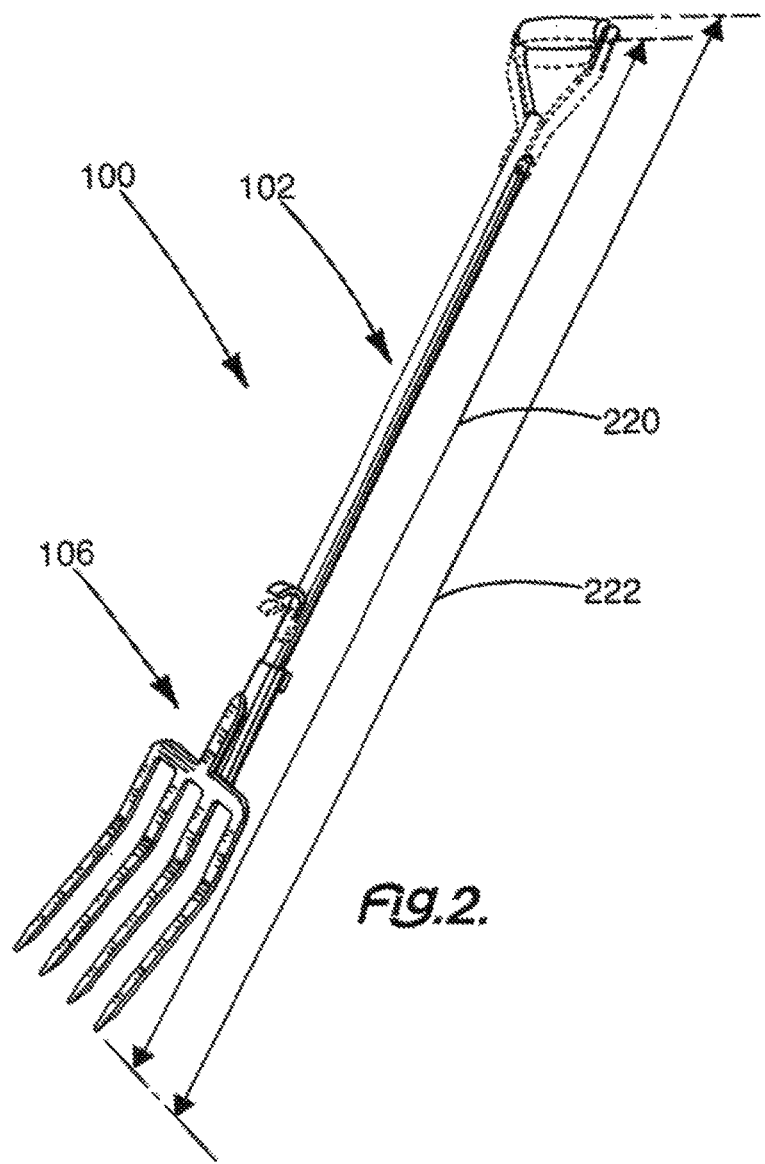
FIG. 2 depicts a front perspective view of a roof shingle removing device 100 compressed length 220 and a relaxed length 222 of the present invention based on FIG. 1.

Now referring to FIG. 1 and FIG. 2, roof shingle removing device 100 has a handle assembly 102 connected to a fork assembly 106 through a shock absorbing assembly 108. With compressed length 220 and relaxed length 222 of FIG. 2, fork assembly 106 effectively contacts roof fasteners to remove shingles.

Figure 3:
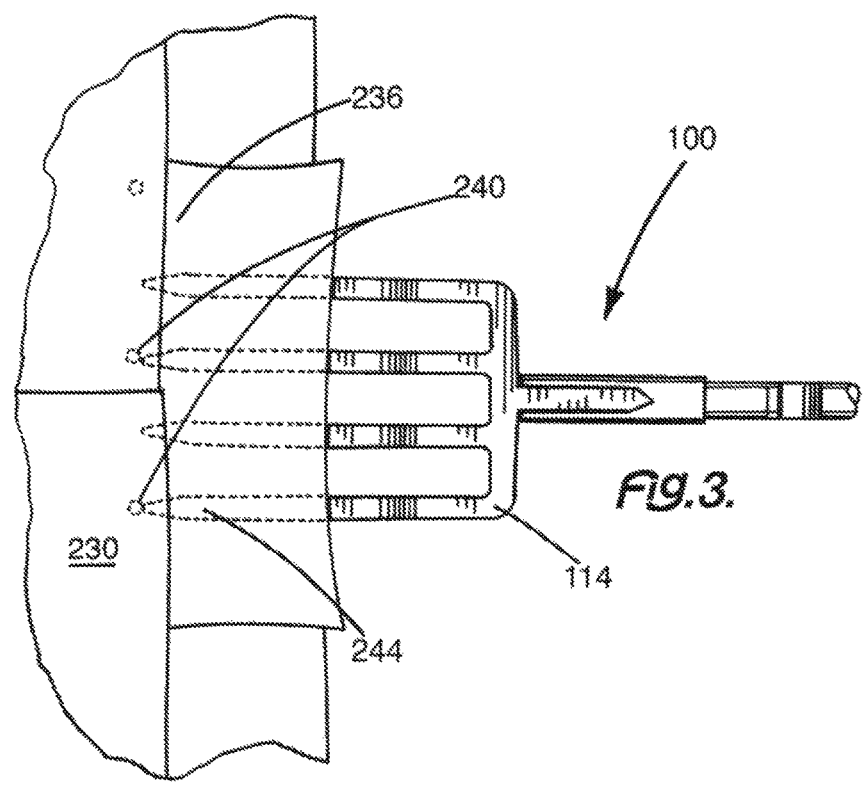
FIG. 3 depicts a front view of a roof shingle removing device 100 of the present invention, in use.

With the addition of FIG. 3 to the consideration, the use of roof shingle removing device 100 becomes clearer. Fork 114 of fork assembly 106 effectively contacts roof 230 and gets under shingles 236. In this shingle fasteners, roof nails such as roof nail 240 are effectively contacted by prong 244 of fork 114. This separates the nail 240 or other fastener and the shingle 236 from the roof 230.

Figure 4:
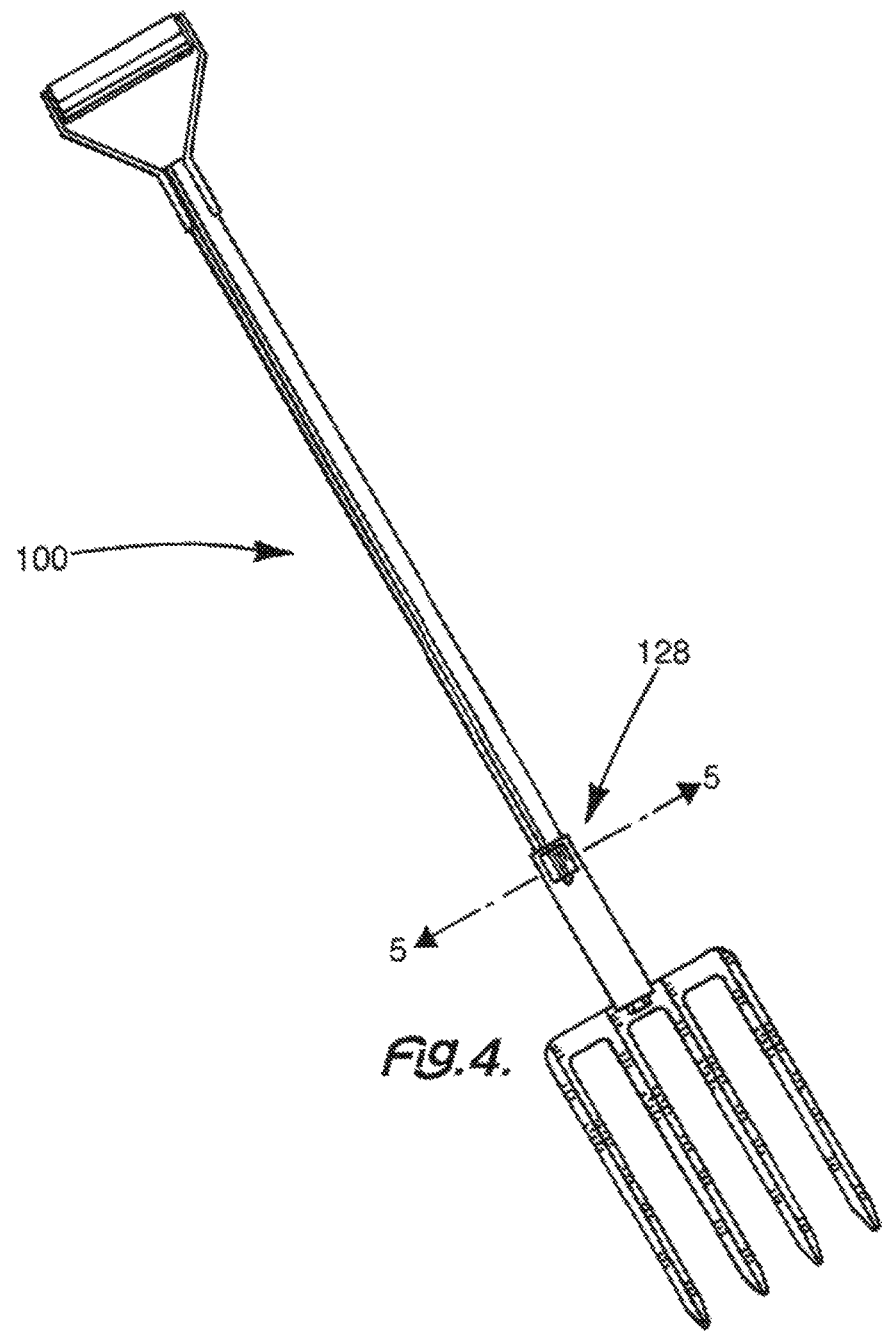
FIG. 4 depicts a rear view of a roof shingle removing device 100 of this invention.
Figure 5:
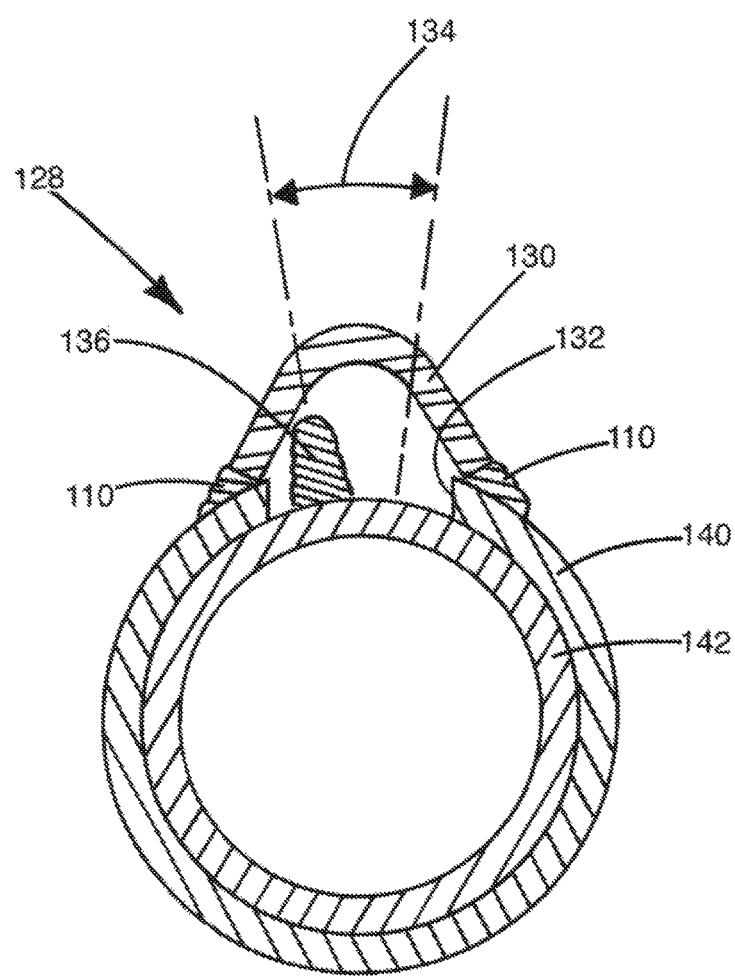
FIG. 5 depicts a cross-section of roof shingle removing device 100 of this invention taken along section line 5-5 shown in FIG. 4.

Adding FIG. 4 and FIG. 5 to the consideration, twist assembly 128 of roof shingle removing device 100 has a turn stop 130 mounted on the compression spring cylinder 140 by twist weld 110. Handle shaft 142 is slidably and rotatably mounted within the compression spring cylinder 140. Extending from the handle shaft 142 is a turn bead 136 secured thereto. Turn bead 136 permits a slight rotation of the handle shaft 142 within the compression spring cylinder 140 due to the travel slot 132 present in the compression spring cylinder 140. Turn stop 130 is secured on the compression spring cylinder 140 and provides a limited twist travel 134 for turn bead 136. Securing of the compression spring cylinder 140 is permitted by welds 110 or other securing devices at the locations spanning travel slot 132. Thus turn bead 136 moves in a restricted fashion such as limited twist travel 134 within travel slot 132 due to contacts with either side of turn stop 130.

Figure 6:
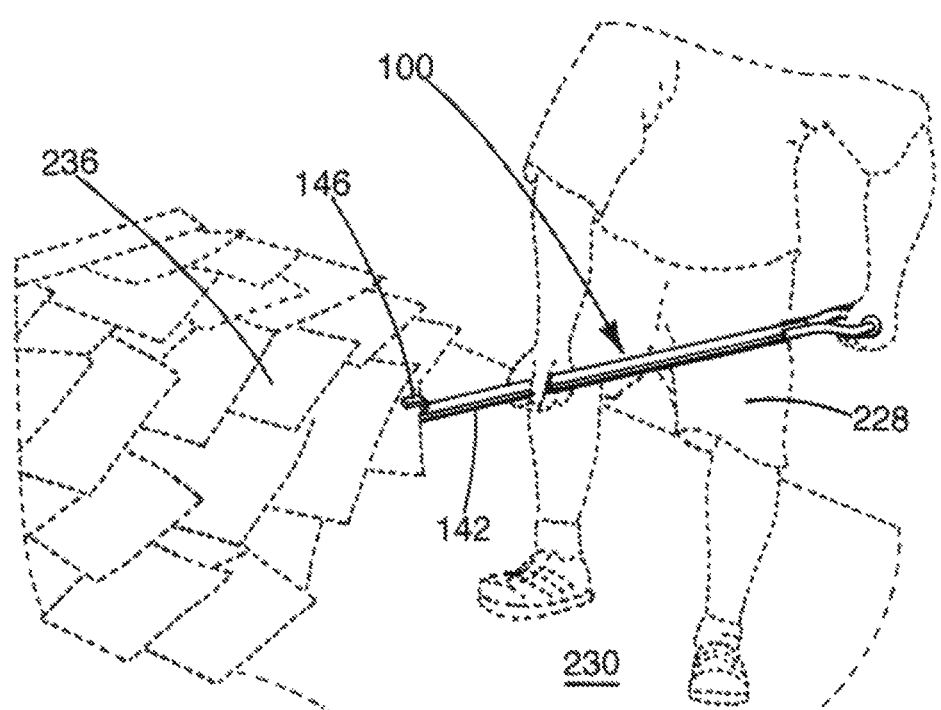
FIG. 6 depicts a perspective view of a roof shingle removing device 100 of the present invention, in use.

By adding FIG. 6 and FIG. 7 to the consideration, it becomes clear that such travel permits fork 114 to move relative to handle shaft 142 and provide for better contact with the roof 230. In this fashion, it is easier for roof shingle removing device 100 to remove shingles 236. The roofer 228 has less pressure on his arms 252, while removing shingles 236 from roof 230.

With FIG. 6, it becomes clear that such travel permits fork 114 to move relative to handle shaft 142, also shown in FIG. 7. Such a twist and spring action provides for better contact with the roof 230. In this fashion, it is easier for roof shingle removing device 100 to remove shingles 236. The roofer 228 has less pressure on his body and on his arms 252, while removing shingles 236 from roof 230. The roofer 228 also is kept from contacting shingles 236 as well as reducing likelihood of injury from shingles 236 sliding up the handle shaft 142 onto his or her arms 252.

Additionally, the shingle guard 146 is mounted on the handle assembly 102. This shingle guard 146 prevents shingles 236 from sliding up the handle shaft 142. Then roofer 228 has a reduced chance of getting hit by a shingle 236. The shingle guard 146 is welded or otherwise secured onto the handle shaft 142.

For example, a user grasps handle assembly 102 of the shingle removing device 100 and applies downward pressure on the handle shaft 142 thereof. In this fashion, the handle shaft 142 depresses the compression spring 122. When the pressure is released from compression spring 122, it functions to absorb the majority of the shock through the shingle removing device 100, thereby decreasing the energy applied to the user. The terms shingle and roof shingle may be used interchangeably.

The shingle removing device 100 moves the force away from the roofer 228. For example, during use, removal, or stripping of shingles 236 can generally be a continuous process, where the fork 114 slips smoothly under each shingle 236. However, issues can arise when the prong 244 contacts a fastener 240 for the shingles resulting in the force being absorbed by the arms 248 of the roofer 228. The shingle removing device 100 helps to alleviate the force accompanied by the sudden stop from the contact with a fastener or fasteners 240 on the wood deck or the roof 230. The device 100 makes the result of the action depicted in FIG. 6 less jarring and less fatiguing to the user.

Figure 8:
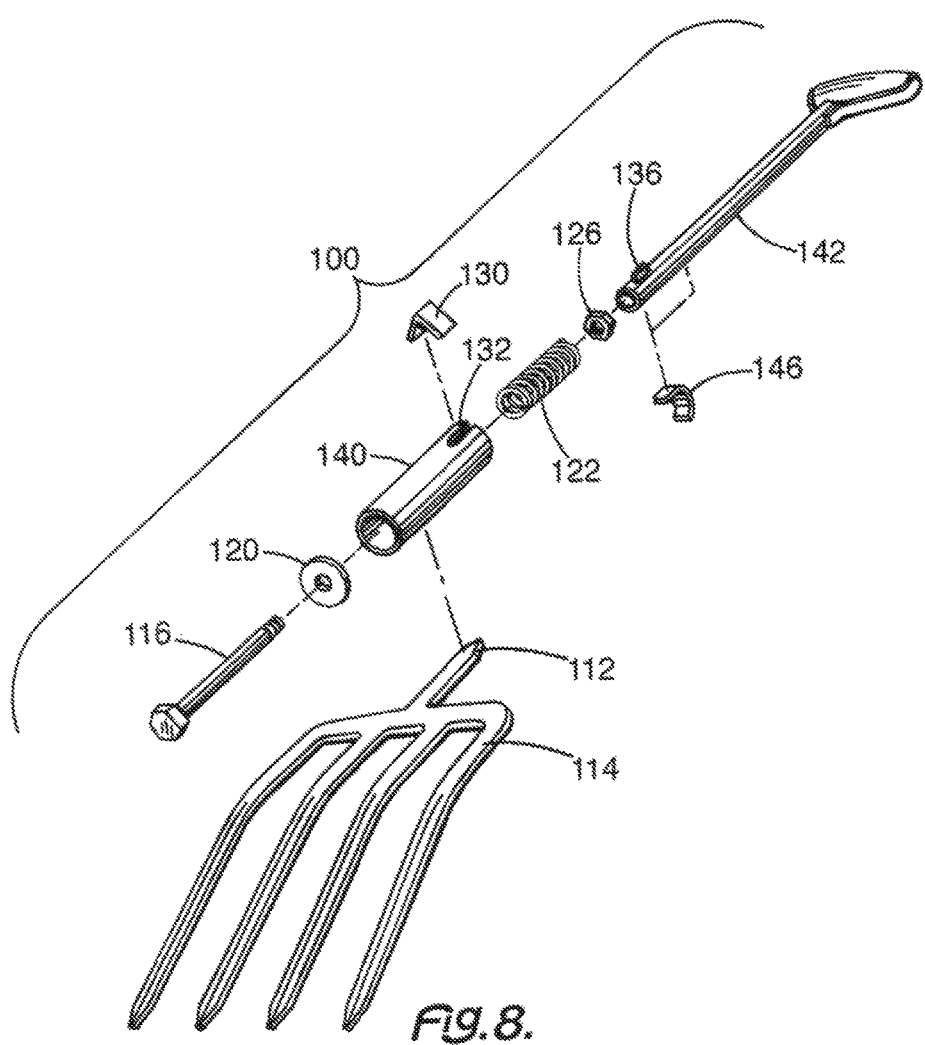
FIG. 8 depicts a front, exploded perspective view of a roof shingle removing device 100 of the present invention.
Figure 9:
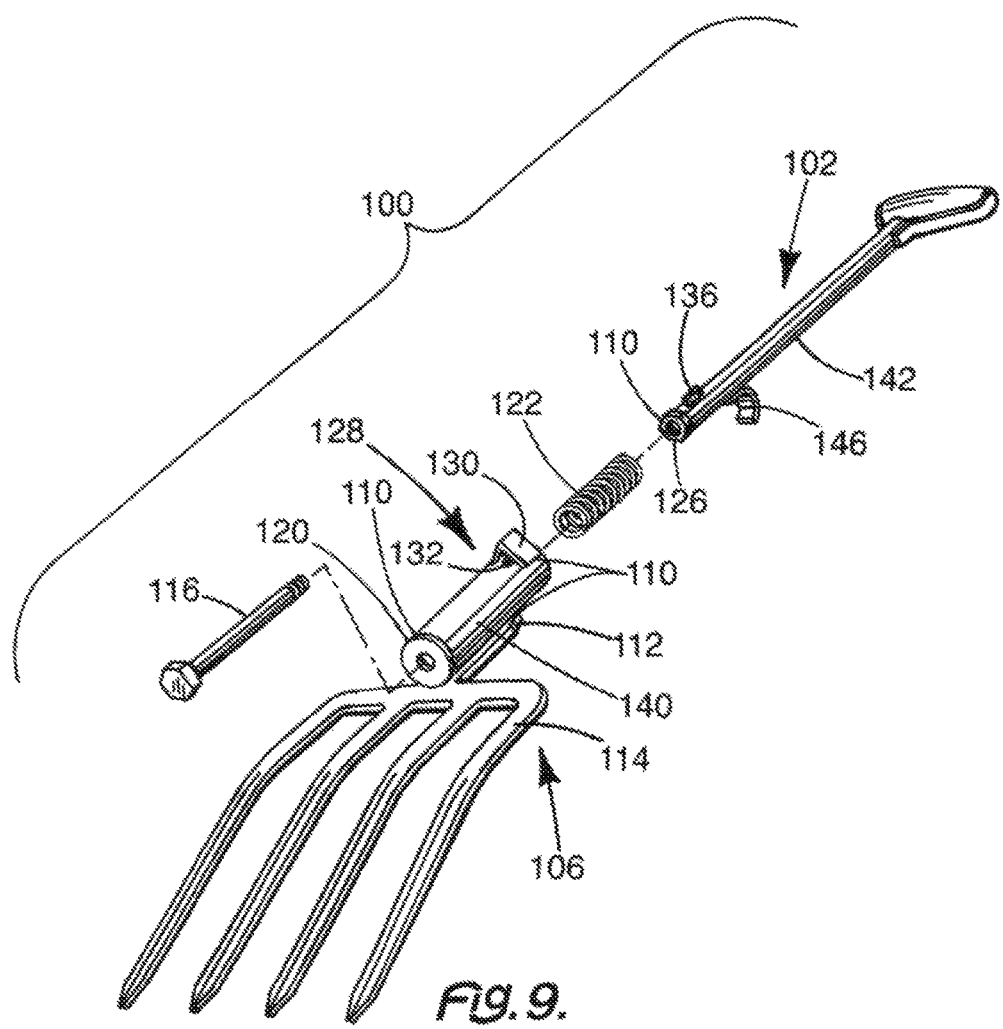
FIG. 9 depicts a rear, exploded perspective view of a roof shingle removing device 100 of the present invention, as the reverse view of FIG. 7.

With the exploded views shown in FIG. 8 and FIG. 9, the functioning of roof shingle removing device 100 becomes more clear. Fork 114 has a weld member 112 which is secured to compression spring cylinder 140. Bolt 116 passes through the washer 120 into the compression spring 122 which is slightly mounted within compression spring cylinder 140 and secured thereon by the nut 126. The compression spring cylinder 140 is then secured to the handle shaft 142 by inserting handle shaft 142 into compression spring cylinder 140 so that turn bead 136 fits into the travel slot 132 of twist assembly 128 underneath turn stop 130. Twist assembly 128 makes shingle remover tool 100 more efficient and minimizes strain on the roofer 228, by varying the position of fork 114 in use.

Figure 10:
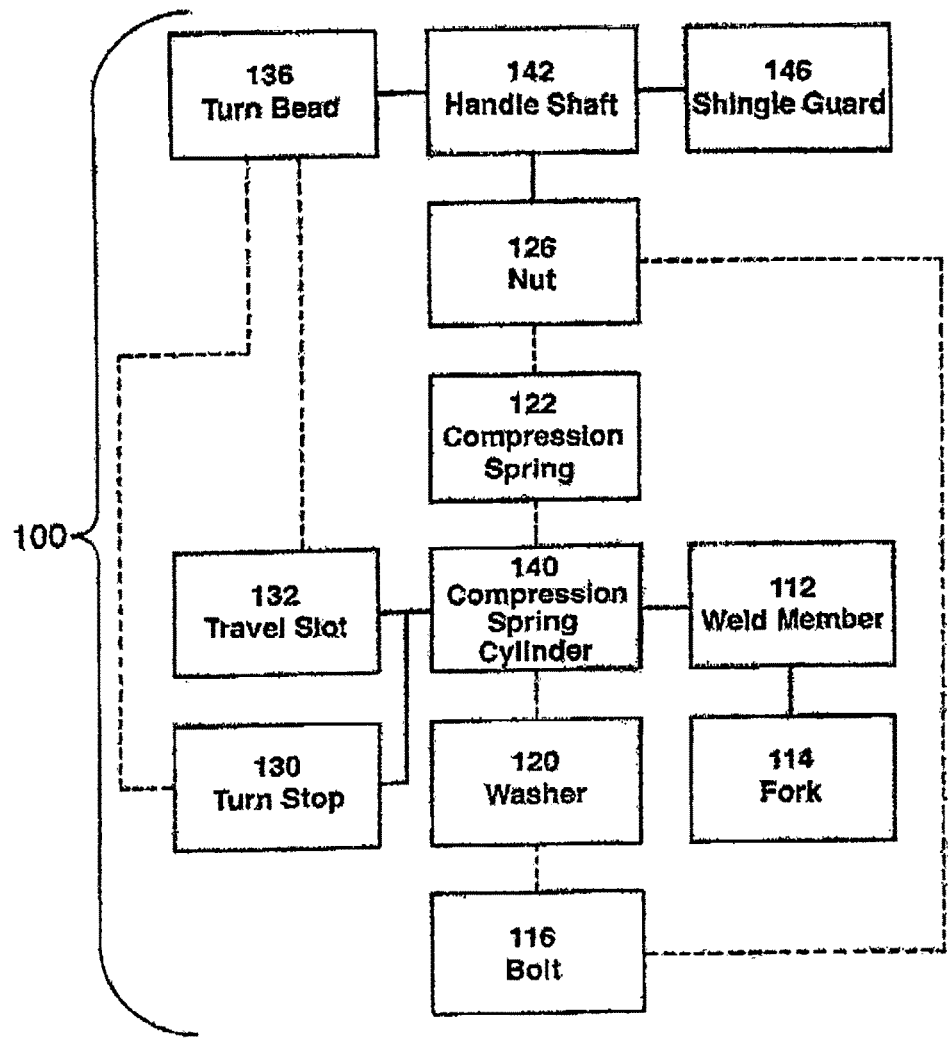
FIG. 10 depicts a block diagram of a roof shingle removing device 100 of this invention.

Now referring to FIG. 10, shingle remover tool 100 has handle shaft 142 with turn bead 136 and shingle guard 146 mounted thereon. Fitting within handle shaft 142 is handle nut 126. Also adjacent to the handle shaft 142 is compression spring 122 compression spring cylinder 140 held in place by nut 126 in commendation washer 120 into 116. Nut 126 and bolt 116 combine with washer 120 tool to hold compression spring 140 in place. Travel slot 132 is secured to compression spring cylinder 140. Weld member 112 of fork 114 secures fork 114 to compression spring cylinder 140. Travel slot 132 combines with turn bead 136 and turn stop 130 to limit the rotation of fork 114 and make the shingle remover tool 100 more efficient.

Referring to FIG. 11 and FIG. 12, which serves as another embodiment of the present invention, the dual spring removing device 200 has a tool handle 202 at one end and a tool fork 212 at the other end. The tool handle 202 is secured to a tool shock damper 206. The shock damper 206 is secured to the tool fork 212. The tool fork 212 serves as a stripping element for shingles 236. The shock damper 206 permits energy to be absorbed by the dual spring removing device 200 rather than the arms 252 of the roofer 228 in a manner similar to shingle removing device 100.

The stripping element tool fork 212 at one end of the body or tool handle 200 works has the shock absorbing system or tool shock damper 206 including a first parallel arm 240 and a second parallel arm 242 extending from the horizontal top section 244. First parallel arm 240 and second parallel arm 242 are connected as mutually co-parallel to opposing ends of horizontal top section 244.

Connecting arm 250 joins horizontal top section 244 to handle 202 at a center portion 252 of horizontal top section 244. Shock absorbing system or tool shock damper 206 is secured to stripping element or tool fork 212 at first parallel arm 240 and second parallel arm 242 as oppositely disposed from horizontal top section 244.

The stripping element or tool fork 212 is preferably a pitchfork having parallel tines, although other shapes usable. More specifically, pitchfork or tool fork 212 has a tine support 260 attached to first parallel arm 240 and second parallel arm 242 with a first outer tine 262 and a second outer tine 264, with a first inner tine 266 and a second inner tine 268 therebetween. The stripping element 212 can be tool fork 114. The stripping element 212 may also be shovel, a hoe, a blade, or a cutting device, as shown in FIG. 10.

A u-shaped shingle guard 210 is secured in a desirable fashion to each of first parallel dun 240 and second parallel arm 242 in a standard fashion. The shingle guard 210 thereby reinforces the structure from first parallel arm 240 and second parallel arm 242, while at same time reducing the chance for shingle to contact a user like the roofer 228 shown in FIG. 7.

The shock absorbing system tool with shock damper 206 is set forth as having a spring-loaded mechanism 270. Spring-loaded mechanism includes a flexible outer sleeve 272 forming an upper section of first parallel arm 240 and second parallel arm 242. Within the flexible outer sleeve 272 is an inner sleeve 274. Inner sleeve 274 is connected to a piston 276 at its lower end. The piston 276 is connected with a coil spring like spring 122 of FIG. 8 within outer sleeve 272 or similar device. Between the piston 276, the flexible outer sleeve 272 and the inner sleeve 274; energy is absorbed by roof shingle removing device 100, instead of being absorbed by the user of the dual spring removing device 200. The dual spring removing device 200 is used in fashion similar to that shown in FIG. 6 and FIG. 7.

For example, a user (like roofer 228 of FIG. 6) will grasp tool handle 202 of the dual spring removing device 200 and apply downward pressure thereon. This action applies pressure to the flexible outer sleeve 272, which in turn, slides the year sleeve, thereby pushing the piston 276 in a downward direction. In this fashion, the piston 276 depresses the coil spring 278. When the pressure is released from coil spring 278, it functioned to absorb the majority of the shock through the roof shingle removing device 100, thereby decreasing the energy applied to the user.

The shock absorbing system or tool shock damper 206 insures the smoother operation of the dual spring removing device 200, but more importantly, moves the force away from the user of the dual spring removing device 200. For example, during use, removal, or stripping of shingles can generally be a continuous process, where the stripping element slip smoothly under each single. However, Issues can arise when the stripping element contacts a fastener for the shingles resulting in a jerking action against the body of the user. This shock absorbing system 206 helps to alleviate the jerking action accompanied by the sudden stop from the contact with a fastener or fasteners on the wood deck or the roof. The dual spring removing device 200 makes the result of the tear-off action drawing less jarring and less fatiguing to the user.

This application—taken as a whole with the abstract, specification, claims, and drawings being combined—provides sufficient information for a person having ordinary skill in the art to practice the invention as disclosed and claimed herein. Any measures necessary to practice this invention are well within the skill of a person having ordinary skill in this art after that person has made a careful study of this disclosure.

Because of this disclosure and solely because of this disclosure, modification of this method and device can become clear to a person having ordinary skill in this particular art. Such modifications are clearly covered by this disclosure.

What is claimed and sought to be protected by Letters Patent of the United States is:

1. A shock absorbing roof shingle removing device for removing shingles and fasteners from a roof deck comprising:
    a handle assembly connected to a stripping element;
    the handle assembly having a proximal handle end oppositely disposed from a distal handle end;
    a shock absorbing assembly connecting the handle assembly and the stripping element;
    the shock absorbing assembly having a proximal shock absorber end and a distal shock absorber end;
    the stripping element having a proximal stripping end oppositely disposed from a distal stripping end;
    the proximal handle end of the handle assembly including a tool handle for gripping or using the shock absorbing roof shingle removing device;
    the distal handle end of the handle assembly connected to the proximal shock absorber end of the shock absorbing assembly;
    the distal shock absorber end of the shock absorbing assembly connected to the proximal stripping end of the stripping element;
    the handle assembly having a ventral handle side and a dorsal handle side;
    the ventral handle side being oppositely disposed from the dorsal handle side;

a shingle guard being connected to the ventral handle side of the handle assembly;
the shingle guard safeguarding the user from a shingle, which may slide up the handle assembly;
the handle assembly having a distal end oppositely disposed from a gripping end;
a twist assembly connecting the distal handle end of the handle assembly to the shock absorbing assembly; and
the twist assembly adjusting an angle of the stripping element as it contacts the shingle.

2. The shingle removing device of claim 1 further comprising:
the shock absorbing assembly including a compression spring cylinder with a proximal spring cylinder end oppositely disposed from a paring cylinder distal end;
the compression spring cylinder having a travel slot on a dorsal side of the compression spring cylinder and a ventral side of the compression spring cylinder;
the dorsal side of the compression spring cylinder being oppositely disposed from ventral side of the compression spring cylinder;
a compression spring being fitted lengthwise inside the compression spring cylinder;
a bolt passing through, at least one washer and the compression spring cylinder;
the compression spring within the compression spring cylinder securing the shock absorbing assembly to the handle assembly by threading the bolt with a nut on the distal end of the handle assembly; and
a turn stop being welded to the ventral side of the compression spring cylinder that spans the travel slot on the dorsal and ventral side of the compression spring cylinder to further secure handle assembly.

3. The shingle removing device of claim 2 further comprising:
a weld member on the proximal end of the stripping element attaching stripping element to a ventral shock side of the shock absorbing element; and
a blade, a fork, a shovel, a hoe, or a cutting device being secured on the distal end of the stripping element.

4. A dual shock absorbing system for a roof shingle removing device comprising:
a tool handle being connected to a stripping element;
the tool handle having a proximal tool handle end oppositely disposed to a distal tool handle end;
a shock absorbing system connecting the tool handle and the stripping element;
the shock absorbing system having a proximal shock end and a distal shock end;
the shock absorbing system including a horizontal top section with a proximal section end and a distal section end;
the proximal section end being attached to the distal ends of the tool handle;
the distal section end being attached to a first parallel arm and a second parallel arm;
the first parallel arm and the second parallel arm being parallel to the length of the tool handle;
the first parallel arm and the second parallel arm both having a distal end and a proximal end;
the first parallel arm and the second parallel arm both having a spring loaded mechanism;
the spring loaded mechanism having an inner sleeve and a flexible outer sleeve;
the flexible outer sleeve and the inner sleeve forming an upper section of the first parallel arm and the second parallel arm;
the inner sleeve having a distal inner sleeve end oppositely disposed from a proximal inner sleeve end;
the flexible outer sleeve having a distal outer end and a proximal outer end;
the distal inner sleeve connecting to a piston;
the piston connecting to a coil spring;
the shock absorbing system having a ventral shock side oppositely disposed from a distal shock side;
a shingle guard being attached to the ventral shock side and the distal shock side;
the first parallel arm and the second parallel arm each having a distal parallel end oppositely disposed from a ventral parallel end;
the distal end of the first parallel arm and the second parallel arm being attached to the stripping element; and
the stripping element consisting of a first outer tine, a second outer tine, a first inner tine and a second inner tine.

5. A shock absorbing roof shingle removing device for removing shingles and fasteners from a roof deck comprising:
a handle assembly connected to a stripping element;
the handle assembly having a proximal handle end oppositely disposed to a distal handle end;
a shock absorbing assembly connecting the handle assembly and the stripping element;
the stripping element including a fork, a shovel, a hoe, a blade, or a cutting device;
the shock absorbing assembly providing a compressed length and a relaxed length to assist a roofer;
a twist assembly for the roof shingle removing device cooperating with the shock absorbing assembly to assist the roofer;
the shock absorbing assembly including a compression spring cylinder, a compression spring, and a fastening means;
the compression spring cylinder receiving the compression spring therein;
the fastening means securing the compression spring within the compression spring cylinder;
the compression spring cylinder having the stripping element secured at a first end thereof;
the compression spring cylinder having the handle assembly secured at or in a second end thereof; and
the first end being oppositely disposed from the second end.

6. The roof shingle removing device of claim 5 further comprising:
the stripping element being a fork;
the fork including a weld member;
the weld member being secured to the compression spring cylinder;
the fastening means including a bolt, a washer and a nut; and
the bolt passing through the washer into the compression, spring to be secured by the nut.

7. The roof shingle removing device of claim 6 further comprising:
the bolt being within the compression spring;
the compression spring being slidably mounted within the compression spring cylinder;
the handle assembly including a handle shaft;
the handle shaft being movably mounted within the compression spring cylinder;
a turn bead being secured to the handle shaft;

the twist assembly including a travel slot and a turn stop; and the travel slot receiving the turn bead.

8. The roof shingle removing device of claim 7 further comprising:

the compression cylinder being connected to the handle shaft by an insertion of the handle shaft into the compression cylinder;

the turn bead fitting into the travel slot of the twist assembly and underneath the turn stop; and the turn bead and the turn stop limiting the rotation of the handle assembly relative to the stripping element.

9. The roof shingle removing device of claim 8 further comprising:

the twist assembly making the roof shingle removing device more efficient;

the twist assembly minimizing strain on a user thereof;

the handle shaft with the turn bead permitting a slight rotation of the handle shaft within the compression spring cylinder due to the travel slot present in the compression spring cylinder; and the turn stop being secured on the compression spring cylinder in order to provide a limited twist travel for the turn bead.

10. The roof shingle removing device claim 9 further comprising:

the twist assembly being secured to the compression spring cylinder with the turn stop spanning the travel slot; and the turn bead moving in a restricted fashion within the travel slot due to contacts with the turn stop thereby permitting the fork to move relative to the handle shaft and provide for better contact with a roof.

11. The roof shingle removing device of claim 10 further comprising:

a shingle guard being mounted on the handle assembly;

the shingle guard preventing a shingle from sliding up the handle shaft in order to provide the roofer with a reduced chance of getting hit by a shingle;

the shingle guard being secured to the handle shaft;

the user grasping the handle assembly of the shingle removing device;

the user applying downward pressure on the handle shaft;

the handle shaft applying pressure to the compression spring;

a release of the compression spring absorbing the majority of the shock through the shingle removing device.

12. The roof shingle removing device of claim 9 further comprising:

the twist assembly being secured to the compression spring cylinder with turn stop spanning the travel slot; and the turn bead moving in a restricted fashion within the travel slot due to contacts with the turn stop thereby permitting the fork to move relative to the handle shaft and provide for better contact with a roof.

13. The roof shingle removing device of claim 12 further comprising:

the shingle guard preventing a shingle from sliding up the handle shaft in order to provide the roofer with a reduced chance of getting hit by a shingle;

the shingle guard being secured to the handle shaft;

the user grasping the handle assembly of the shingle removing device;

the user applying downward pressure on the handle shaft;

the handle shaft applying pressure to the compression spring; and a release of the compression spring absorbing the majority of the shock through the shingle removing device.

\* \* \* \* \*